Aug. 26, 1924.
A. F. NACKERS
AUTOMOBILE LUBRICATOR
Filed March 1, 1920
1,506,249
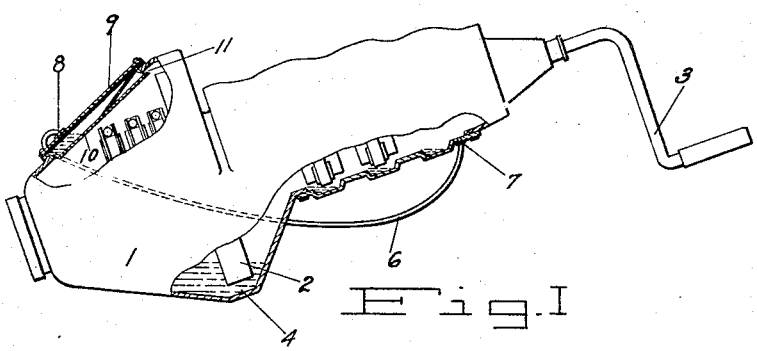
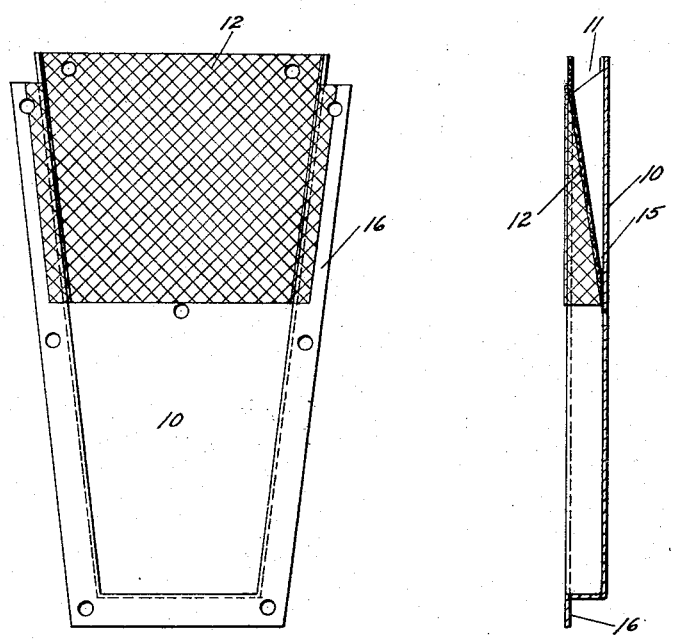
INVENTOR:
Albert Francis Nackers
BY
Atkins & Atkins
ATTORNEYS Patented Aug. 26, 1924.

1,506,249

UNITED STATES PATENT OFFICE.

ALBERT FRANCIS NACKERS, OF CORNELIUS, OREGON.

AUTOMOBILE LUBRICATOR.

Application filed March 1, 1920. Serial No. 362,430.

*To all whom it may concern:*

Be it known that I, ALBERT FRANCIS NACKERS, a citizen of the United States of America, and resident of Cornelius, in the county of Washington, in the State of Oregon, have invented certain new and useful Automobile Lubricators, of which the following is a specification, reference being had to the accompanying drawing.

The object of my invention is to provide means for effecting constant and sufficient lubrication of the crank shaft of an automobile and parts appurtenant thereto throughout the entire length of its bearings and under all varying conditions that occur in service.

My invention is especially applicable to machines of the Ford type, but its use is not in any wise restricted thereto.

In accomplishing the end in view, I provide a conduit as a part of a circulatory system, disposed in operative communication between parts of the shaft bearings that are remote one from the other, and, in order to effect an uninterrupted circulation of oil through said system, I interpose, as a part of my invention, in the line of said conduit, an oil collector and strainer chamber consisting substantially of an enlarged chamber provided with a foraminous diaphragm of disposition and design specially contrived to effect the purpose desired.

What constitutes my invention will be hereinafter specified in detail and succinctly set forth in the appended claims.

In the accompanying drawing,

Figure I is a side elevation, partly in section, of the shaft and transmission case of a Ford motor equipped with my invention, and showing it inclined slightly from the horizontal as on an up climb.

Figure II is a front elevation of one wall of the collector and strainer chamber of my device detached.

Figure III is a vertical medial section of the subject matter of Figure II.

Referring to the numerals on the drawing, 1 indicates the outside transmission shell of a crank shaft which extends substantially from end to end thereof, carrying as usually disposed along its length, the parts that rotate with it including, for example, a fly wheel 2, and terminating at its forward end, for example, in the usual crank handle 3.

The shell 1 may be made of any usual or preferred shape and extent, but made to comprehend in its contour an oil bay 4, within which the fly wheel 2 rotates with the effect of taking up accumulation of oil in the bay and effectively distributing it by splashing it against the interior of the walls of the shell and thence to the bearings of the machinery within the shell 1.

Such represents the usual provision made for lubrication in Ford machines, for example, and is ordinarily sufficient for the purpose, despite the fact that the forward end of the shaft is liable to run dry for want of lubrication on a long climb. So long as the machine is running substantially on the level, lubrication is ample, provided there is no stoppage of the flow of the oil. It is the purpose of my invention, not only to make provision for proper lubrication in machines of the type described, under all conditions, but also to provide means for effectively preventing stoppage at any time of the free flow of the oil upon which said lubrication depends.

This I accomplish by providing a tube or conduit 6 in operative communication with the bottom of the interior of the shell 1 towards its forward end, as indicated at 7, and with the top of the shell, as indicated at 8. The connection at 8 is preferably made through the angularly disposed inspection plate 9 that is usually provided as a removable addition to the shell 1.

Underneath the plate 9 and securable to the shell 1 by the same bolts or taps that fasten that member in place, I provide one wall 10 of a collector chamber that is made of metal and closed on all sides but one which is left open to form a mouth or intake 11. The chamber is completed by the presence in place of the plate 9. Its mouth 11 is at all times, except on steep down grades, its highest part, and the connection 8 therewith is ordinarily disposed on a slightly higher level than the connection 7. Consequently, there is always a siphon and gravity feed tendency through the tube 6 from the point of connection 8 to 7, except when by the dip of the axis of the shell on steep down grades, the liquid contents of the shell 1 is precipitated toward the forward end. At such times, of course, there is no lack of lubrication of the forward bearings. Accordingly provision for such lubrication being made at such time as the angle of inclination of the axis of the shell is reversed to the pitch, for example, shown in Figure I of the drawing, provision for lubrication under all conditions of service is theoretically made.

In practice, however, it is necessary to provide against obstruction of the flow of oil that is liable to be occasioned by the accumulation of trash in the body of the oil. To that end, I provide a foraminous screen 12, or screen of wire gauze across the collector chamber to constitute a strainer interposed in the line of the conduit 6. The screen 12 is preferably incorporated into the structure of the wall 10, as is clearly shown in the several figures of the drawings, and is preferably inclined, as best shown in Figure III, in order that it may effectively present the greatest expanse of superficial area to the flow of oil, and also to form a pocket 15, for catching and holding trash without material impairment of its straining function.

By keeping the oil clean, it is kept in condition for following its cycle of circulation, that is to say, forwardly through the tube 6 from the collector chamber formed by the walls 9 and 10, back to the bay 4, whence it is conveyed, through centrifugal action of the fly wheel 2, to the mouth 11 of said chamber.

It should be noted that as often as the axis of the shell 1 is sharply deflected, as it would be in traveling steep down grades, there is a regurgitation of oil from the collector chamber through the screen 12 with the effect of cleansing the pocket 15 of trash and throwing it back into the bay 4, where it can do no harm. It is only to facilitate and insure its passage through the narrow conduit 6 that the oil need to be strained.

I prefer to provide the frame 10 with a flange 16 for clamping it in place between the shell 1 and the plate 9, and also prefer to extend the screen 12 laterally to extend partly across the flange 16, as shown clearly in Figure II.

What I claim is:—

1. The combination with a transmission casing of an inspection plate on said casing, a lubricant collecting chamber beneath said plate, a common means securing said plate and chamber to the casing, a conduit leading from said chamber to one end of the casing, and a diagonally disposed screen within said chamber for straining the lubricant admitted to the conduit.

2. The combination with a transmission casing of an inspection plate on said casing, a lubricant collecting chamber beneath said plate having laterally projecting flanges, means extending through said flanges for securing said chamber between said plate and casing, a conduit leading from said chamber to the forward end of the casing, and a diagonally disposed screen within said chamber for straining the lubricant conducted to the forward end of the casing through said conduit.

3. The combination with a transmission casing of an inspection plate on said casing, a lubricant collecting chamber beneath said plate, a diagonally disposed screen having laterally extending supporting flanges resting on said chamber, a common means securing the plate and the screen and the collecting chamber to the casing, and means conducting the strained lubricant from the chamber to the forward end of the casing.

In testimony whereof, I have hereunto set my hand in the presence of two subscribing witnesses.

ALBERT FRANCIS NACKERS.

Witnesses:
JOSEPH L. ATKINS,
LEICESTER B. ATKINS.